UNITED STATES PATENT OFFICE.

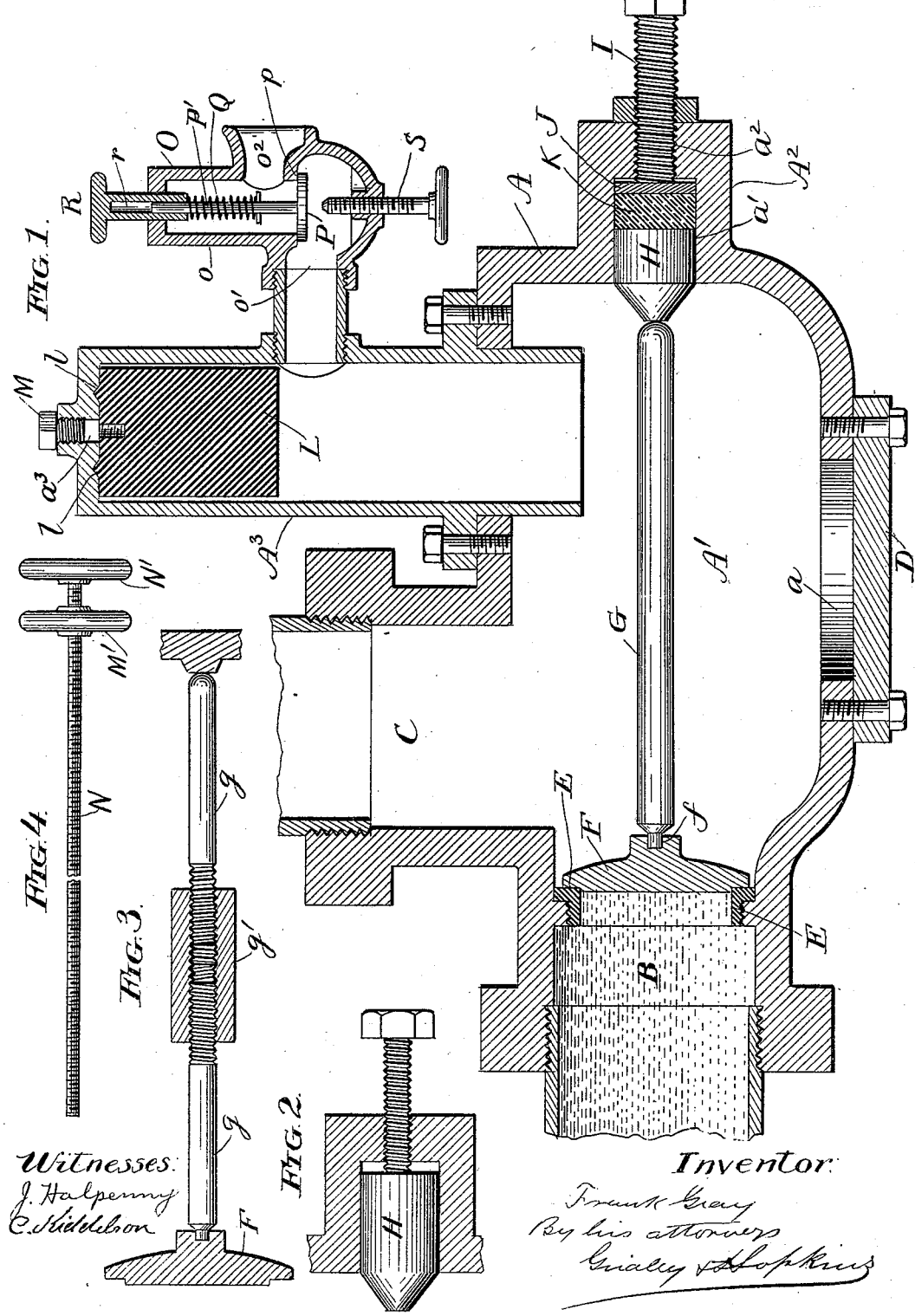

FRANK GRAY, OF CHICAGO, ILLINOIS.

VALVE FOR AUTOMATIC FIRE-EXTINGUISHERS.

SPECIFICATION forming part of Letters Patent No. 532,874, dated January 22, 1895.

Application filed June 18, 1894. Serial No. 514,928. (No model.)

*To all whom it may concern:*

Be it known that I, FRANK GRAY, a citizen of the United States, residing at Chicago, in the county of Cook and State of Illinois, have invented certain new and useful Improvements in Valves for Automatic Fire-Extinguishers, of which the following is a specification, reference being had to the accompanying drawings, which are made a part hereof, and in which—

Figure 1 is a vertical section of one of the improved valves, set and in readiness for operation. Figs. 2 and 3 are views of some of the parts of slightly modified construction. Fig. 4 is an elevation of the mechanism for lifting and setting the weight.

The invention relates to what is known as the main valve (which is the valve used in a dry pipe system for preventing the admission of water to the system until the pressure within the system is reduced), and it consists in the features of novelty that are particularly pointed out in the claims hereinafter.

In the drawings A represents a casing, which may be of any suitable construction, provided with an inlet opening B with which the supply main communicates, and an outlet opening C with which the riser of the distributing system communicates. Neither the supply main nor any part of the distributing system is shown in the drawings, because their construction and their relation to what is shown are well understood by those skilled in the art, and the present invention is not in any way limited by or to the details in their construction. In the bottom of the casing is a hand-hole $a$ for giving access to an interior chamber A', said hand-hole being closed by a covering D.

E is a valve-seat located between the inlet and outlet openings, and F is a valve located in the chamber A' and seating toward the supply main, the purpose of this valve being to control the flow of water from the supply main to the system. In the top side of this valve is a hollow depression $f$ for receiving one end of a valve-stem or strut G, the other end of which is preferably rounded off and bears against the extremity of a block H which occupies and fits snugly, (but so as to be capable of moving endwise therein) a chamber $a'$ formed in an extension $A^2$ of the casing, which extension is provided with a threaded opening $a^2$, whose axis is co-incident with the axis of the strut, for the reception of a screw I which is adapted to bear against the block H through the medium of a steel plate or follower J and a block K of resilient material, such as rubber. By turning the screw I any desired amount of pressure may be applied to the valve F for holding it seated in opposition to the pressure of the water in the main. I prefer the construction shown in the drawings because it is simple and effective. The screw is capable of producing the necessary pressure, the block of resilient material interposed between the valve and casing gives the necessary elasticity, and the frusto-conical shape of the inner end of the block gives a bearing surface which is ample so long as the parts are subjected to a strain only in the direction of the axis of the strut, and which at the same time permits the dislodging of the end of said strut when it is subjected to a force acting upon it laterally, as hereinafter described. If desired, however, the resilient block K and the separate plate J may be dispensed with, and the screw I made to bear directly against the end of the block H, as shown in Fig. 2. As a further modification, all of these parts, H, I, J and K, may be dispensed with and the valve-stem or strut may be formed in two parts, $g$, $g$, threaded and united by a threaded coupling $g'$, whereby it may be adjusted in length so that when one of its ends is in engagement with the valve and the other with a seat $h$ formed for it on the interior of the casing, by turning the coupling in the proper direction the valve may be forced against its seat with the necessary pressure. As a further modification, the strut may be made of friable material and arranged to be broken instead of being simply displaced.

It will be seen that a strut constructed and arranged as above described may be displaced (or broken) by a force acting against it laterally, and when so displaced there will be nothing to hold the valve F seated, and consequently the force of the water in the main will unseat said valve and enter the system. In order to accomplish this lateral displacement of the strut, I provide the casing with a vertical extension $A^3$ having at top an opening $a^3$ communicating with the atmosphere, and I place within this extension a part L which performs the double duty of a hammer or weight for acting against and displacing the strut, and a valve for closing the opening $a^3$. In order that it may effectually perform this latter duty it is provided upon its top side with an annular rib $l$ preferably of V-shape in cross-section which enters a corresponding seat formed in the under side of the top of the extension, around the opening $a^3$. It is the intention to construct this weight L of such size and weight that it will be held in the position in which it is shown in Fig. 1 by the compressed fluid in the system until the pressure falls below five pounds per square inch. Ordinarily the pressure in the system is maintained at about twenty pounds per square inch, so that if this weight is conditioned to fall when the pressure is reduced to five pounds per square inch, a margin of fifteen pounds is left for accidental leakage, resulting from bad joints and the like.

When the weight is in normal position the opening $a^3$ is closed by a screw plug M. When the weight is to be set, said plug is removed, and in its place is put a hand-wheel M′ having through it a threaded opening through which passes a long screw N having at top a hand-wheel N′, or other suitable device, whereby it may be turned. This screw is of sufficient length to reach to the bottom of the casing, and when its lower end is inserted in a threaded perforation in the top of the weight, by turning the hand-wheel M′ the weight may be drawn up into the position for closing the opening $a^3$. After the fluid in the system has been put under the desired pressure, it will hold the weight in this position, and the wheel M′ and screw N may be removed and the opening $a^3$ closed by the plug M.

As before stated, the pressure within the system is usually maintained at about twenty pounds per square inch, and the mechanism for opening the valve and admitting water to the system is conditioned to operate when said pressure is reduced to about five pounds per square inch. Where a number of heads are fired simultaneously, it requires only a few seconds for sufficient air to escape to reduce the pressure to five pounds, but where only say one or two heads are fired it sometimes requires, in large systems, two or three minutes for the pressure to become reduced sufficiently to fire the valve. In order to avoid this delay and hasten the firing of the valve upon the opening of the system by the firing of a head, I provide an auxiliary relief valve, which is shown at O. This valve has a casing $o$ with an inlet opening $o'$ which communicates with some part of the system, and an outlet opening $o^2$ which communicates with the atmosphere. Between the inlet and the outlet is arranged a valve-seat $p$ upon which a valve P is arranged to seat outward (toward the atmosphere), said valve being provided with a stem P′, surrounded by a coiled spring Q which exerts its pressure upon the stem in the direction which tends constantly to unseat the valve. The upper end of this stem enters a socket $r$ in a set screw R which is tapped through the top of the valve casing and bears against the end of the spring in such manner that by turning the screw one way or the other the pressure of the spring upon the valve may be regulated at will. This valve is held normally seated by the pressure of the air in the system, and the spring P is so adjusted that it exerts upon the valve an unseating pressure somewhat less than the pressure which is exerted upon it by the pressure in the system. I prefer to so arrange and proportion these things that upon a reduction of say five pounds per square inch in the system the force exerted by the spring P upon the valve will be greater than the force exerted upon the valve by the remaining fifteen pounds of pressure in the system, so that the spring will unseat the valve and place the system in communication with the atmosphere through the openings $o$ and $o'$. It is the intention that these openings shall be of such capacity that when the valve P is once unseated only a few seconds will be required for sufficient air to escape from the system to reduce the pressure sufficiently to cause the firing of the main valve. When the main valve is fired, water will enter the system and flow through the opening $o'$ into the casing of the valve O, and its upward pressure upon the bottom of the valve P will again reseat it and prevent the discharge of water through the opening $o^2$.

For reseating the valve P, when priming the system, I provide a set screw S which is tapped through the bottom of the valve casing $o$ and is adapted to engage the valve and force it upward. When the system is primed this screw is turned back so as to permit the valve, when unseated, to leave its seat far enough to afford an ample opening for the egress of the water, and at the same time hold it in such position that when the water reaches and fills the lower part of the casing its pressure against the valve will reseat it.

Having thus described my invention, the following is what I claim as new therein and desire to secure by Letters Patent:

1. In a valve for automatic fire extinguishers, the combination of a casing, a valve for controlling the admission of water thereto and means for holding the valve seated, of a weight exposed directly to the pressure within the system, whereby it is held normally elevated by said pressure and conditioned to fall upon a reduction of said pressure and release the valve, substantially as set forth.

2. In a valve for automatic fire extinguishers, the combination of a casing, a valve for controlling the admission of water thereto and means for holding the valve seated, of a weight located within the casing and exposed directly to the pressure within the system, whereby it is held normally elevated by said pressure and conditioned to fall upon a reduction of said pressure and release the valve, substantially as set forth.

3. In a valve for automatic fire extinguishers, the combination of a casing, a valve for controlling the admission of water thereto, means for holding the valve seated, and a weight exposed directly to the pressure within the system whereby it is held normally elevated by said pressure and conditioned to fall upon a reduction of said pressure and release the valve, said weight having upon it a surface which operates as a valve, and said casing having an opening which is normally closed by said valve, substantially as set forth.

4. In a valve for automatic fire extinguishers, the combination with a casing provided at top with an opening, a valve for controlling the admission of water to the casing, and means for holding the valve normally seated, of a weight located in the casing and having on its top side a valve-surface adapted to close the opening aforesaid, the under side of the weight being exposed directly to the air-pressure within the system, whereby it is held normally elevated by said pressure until reduced, whereupon the weight will fall, the means for holding the valve seated being located beneath the weight, substantially as set forth.

5. In a valve for automatic fire extinguishers the combination with a casing and a valve for controlling the admission of water thereto, of a strut located within the casing and engaging said valve for holding it seated, and a weight located within the casing above the strut, said weight being exposed to the pressure within the system whereby it is held normally elevated by said pressure and permitted to fall and displace the strut upon a reduction of said pressure, substantially as set forth.

FRANK GRAY.

Witnesses:
L. M. HOPKINS,
J. HALPENNY.